United States Patent
Rogers

(10) Patent No.: US 9,457,211 B2
(45) Date of Patent: Oct. 4, 2016

(54) TOP ACCESS TO A PUMP MODULE OF A FIRE TRUCK

(71) Applicant: Waterous Company, South St. Paul, MN (US)

(72) Inventor: Todd A. Rogers, Mahtomedi, MN (US)

(73) Assignee: Waterous Company, South St. Paul, MN (US)

( * ) Notice: Subject to any disclaimer, the term of this patent is extended or adjusted under 35 U.S.C. 154(b) by 236 days.

(21) Appl. No.: 14/257,277

(22) Filed: Apr. 21, 2014

(65) Prior Publication Data

US 2014/0311760 A1     Oct. 23, 2014

Related U.S. Application Data

(60) Provisional application No. 61/813,980, filed on Apr. 19, 2013.

(51) Int. Cl.
*A62C 27/00* (2006.01)
*B60P 3/22* (2006.01)
*B62D 33/067* (2006.01)
*B60P 3/42* (2006.01)

(52) U.S. Cl.
CPC ............... *A62C 27/00* (2013.01); *B60P 3/225* (2013.01); *B60P 3/42* (2013.01); *B62D 33/067* (2013.01)

(58) Field of Classification Search
CPC .......... A62C 27/00; B60P 3/42; B60P 3/225; B62D 33/067
USPC ............ 169/24, 25, 52; 180/89.14; 296/35.3
See application file for complete search history.

(56) References Cited

U.S. PATENT DOCUMENTS

| | | |
|---|---|---|
| 4,512,412 A | 4/1985 | Campbell |
| 5,467,827 A | 11/1995 | McLoughlin |
| 5,553,673 A | 9/1996 | Hackman |
| 6,164,560 A | 12/2000 | Lehrke et al. |
| 6,568,559 B2 | 5/2003 | Miller et al. |
| 7,784,554 B2 | 8/2010 | Grady et al. |
| 2003/0230412 A1* | 12/2003 | Archer .................. A62C 27/00 169/24 |
| 2004/0195346 A1 | 10/2004 | McIntyre |
| 2005/0115752 A1* | 6/2005 | Ronacher ............. B62D 33/067 180/89.14 |
| 2007/0286736 A1 | 12/2007 | Grady et al. |
| 2011/0052436 A1* | 3/2011 | Krampe .................. B60P 3/225 280/838 |
| 2012/0193109 A1 | 8/2012 | Moore et al. |

OTHER PUBLICATIONS

HME Innovations, http://www.firetrucks.com/about-us/the-hme-difference, January of 2012.

* cited by examiner

*Primary Examiner* — Steven J Ganey
(74) *Attorney, Agent, or Firm* — Todd R. Fronek; Larkin Hoffman Daly & Lindgren, Ltd.

(57) ABSTRACT

A pump module mountable to a chassis of a fire truck includes a pump assembly having a water pump and plumbing connected to the water pump. A lower housing defines an enclosure that includes opposed exterior panels, opposed interior panels and a top opening defined by an upper perimeter. At least one of the exterior panels maintains a fluid connection to the plumbing of the pump assembly. At least one of the interior panels includes an interior opening to accommodate the chassis and a connection between the water pump and an engine. An upper housing defines a lower perimeter that can be positioned with respect to the upper perimeter of the lower housing. The upper housing transitions between a first, operating position wherein the lower perimeter engages the upper perimeter, and a second, open position wherein the lower perimeter is spaced apart from the upper perimeter.

21 Claims, 19 Drawing Sheets

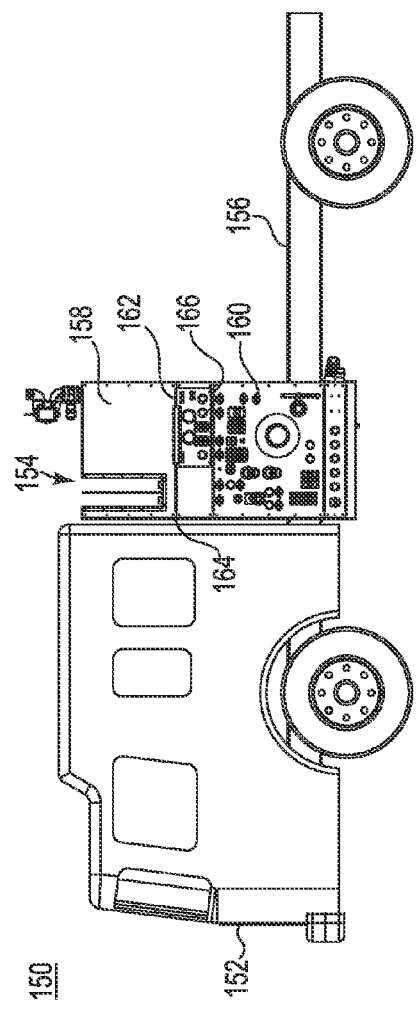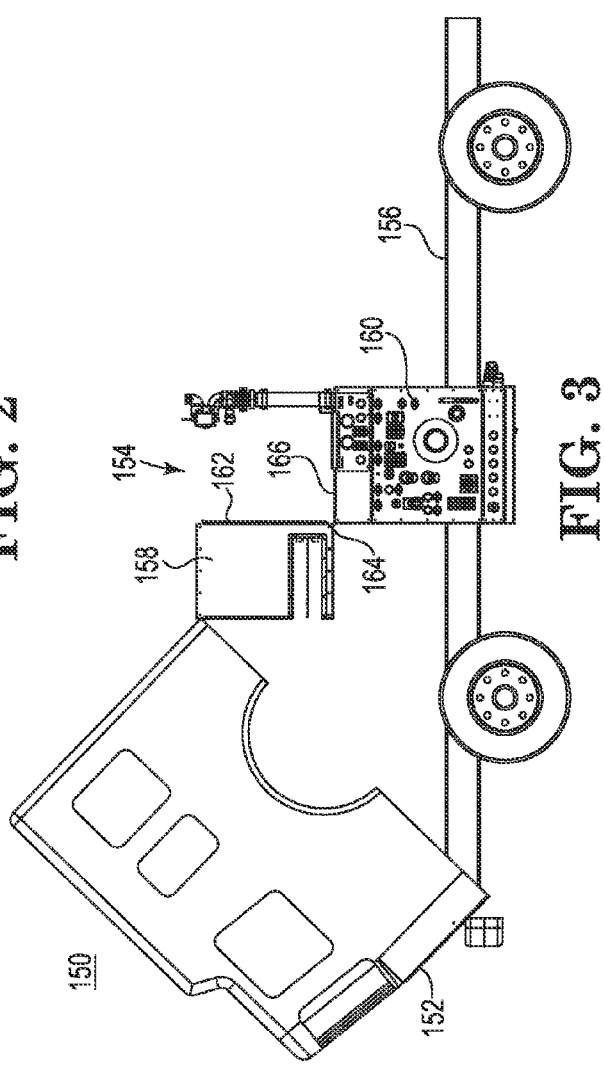

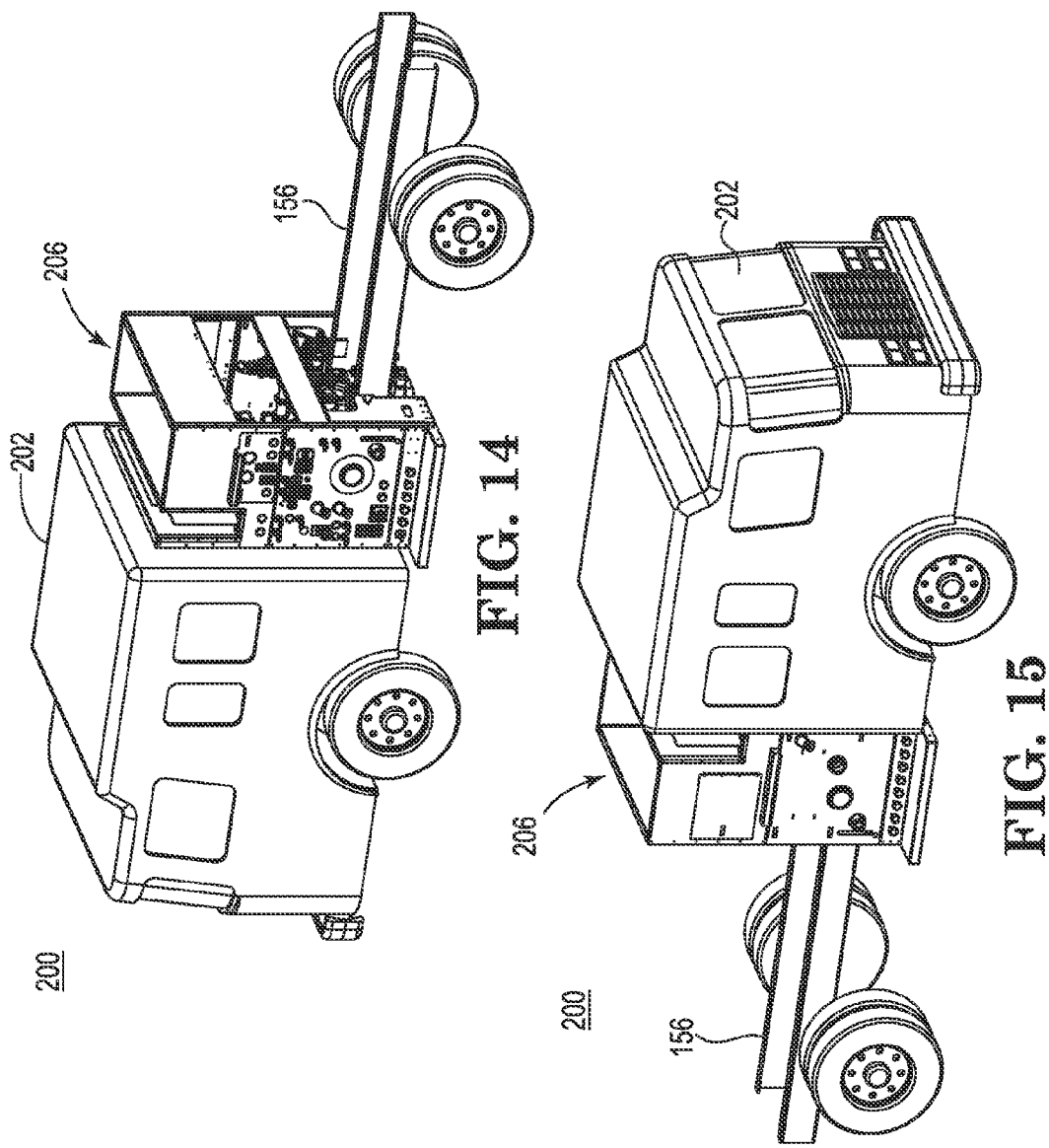

TOP ACCESS TO A PUMP MODULE OF A FIRE TRUCK

CROSS REFERENCE TO RELATED APPLICATION

This application claims priority under 35 U.S.C. §119(e) to U.S. Provisional Patent Application Ser. No. 61/813,980 filed on Apr. 19, 2013, and incorporated herein by reference.

BACKGROUND

On fire trucks, pump modules are used to control movement of water within the fire truck from one or more intakes to one or more outtakes. Current pump modules include a pump, pump transmission, intake plumbing, discharge plumbing, valves and an operator control panel. In some instances, pump modules are built separately from the fire truck and assembled to a chassis of the fire truck during construction of the fire truck. While separately building pump modules can permit faster throughput for construction of a fire truck, maintenance and repair of pump modules after assembly of the fire truck can be difficult, time consuming and expensive.

SUMMARY

In a first aspect of concepts presented herein, a pump module mountable to a chassis of a fire truck includes a pump assembly having a water pump and plumbing connected to the water pump. A lower housing defines an enclosure that includes opposed exterior panels, opposed interior panels and a top opening defined by an upper perimeter. At least one of the exterior panels maintains a fluid connection to the plumbing of the pump assembly. At least one of the interior panels includes an interior opening to accommodate the chassis and a connection between the water pump and an engine. An upper housing defines a lower perimeter that can be positioned with respect to the upper perimeter of the lower housing. The upper housing transitions between a first, operating position, wherein the lower perimeter engages the upper perimeter and a second, open position wherein the lower perimeter is spaced apart from the upper perimeter.

In a second aspect, a fire truck includes an operator cab, a rear body and a pump module assembled to a chassis. The pump module is positioned between the operator cab and the rear body. The operator cab pivots with respect to the chassis from a first, operating position to a second, open position. The pump module includes an upper housing portion and a lower housing portion. The upper housing portion is able to be positioned with respect to the lower housing portion from a first, operating position to a second, open position.

BRIEF DESCRIPTION OF THE DRAWINGS

FIG. 2 is a side view of a fire truck in an operating position with a rear body removed.

FIG. 3 is a side view of the fire truck of FIG. 2 in an open position.

FIGS. 14-15 are isometric views of the fire truck of FIGS. 12-13 with a rear body removed.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

While the disclosure refers to illustrative embodiments for particular applications, it should be understood that the disclosure is not limited thereto. Modifications can be made to the embodiments described herein without departing from the spirit and scope of the present disclosure. Those skilled in the art with access to this disclosure will recognize additional modifications, applications, and embodiments within the scope of this disclosure and additional fields in which the disclosed examples could be applied. Therefore, the following detailed description is not meant to be limiting. Further, it is understood that the systems and methods described below can be implemented in many different embodiments. The operation and behavior of the systems and methods presented are described with the understanding that modifications and variations of the embodiments are possible given the level of detail presented.

References to "one embodiment," "an embodiment," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
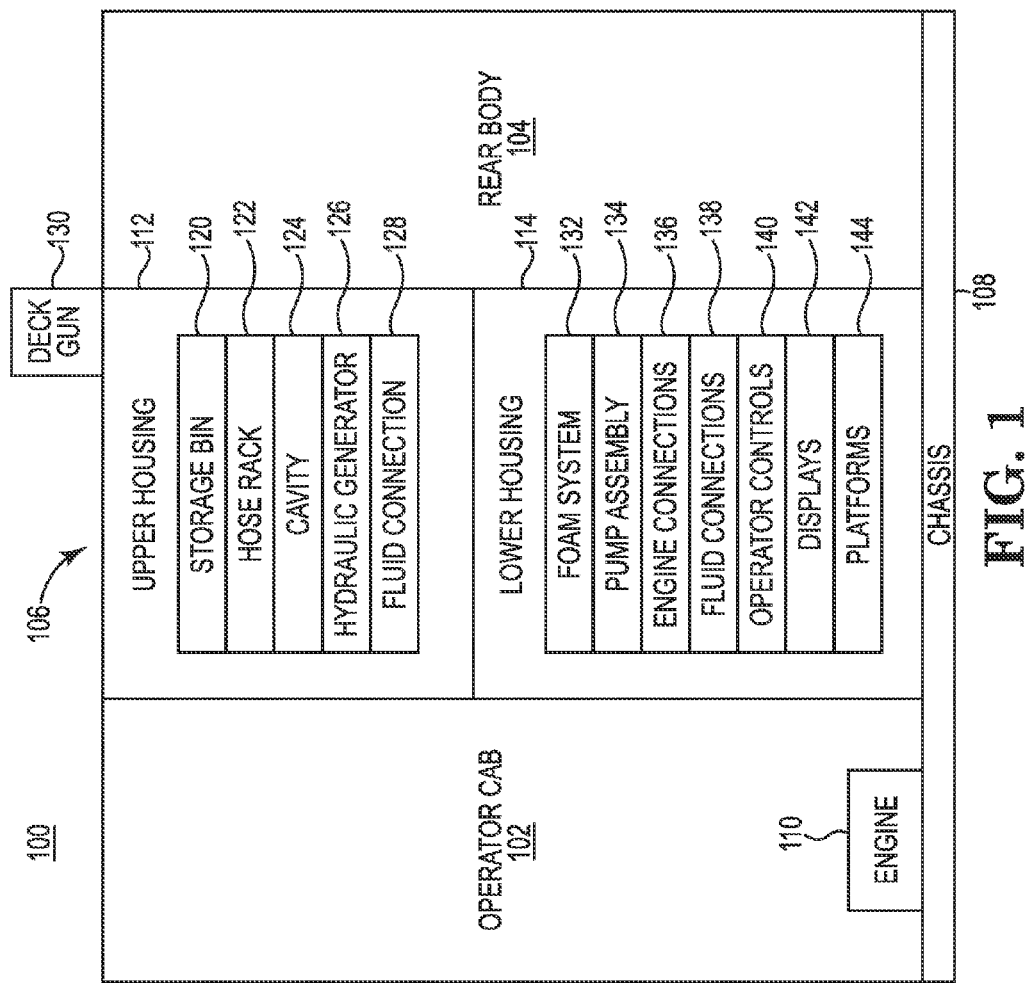
FIG. 1 is a schematic view of components of a fire truck.
Figure 6:
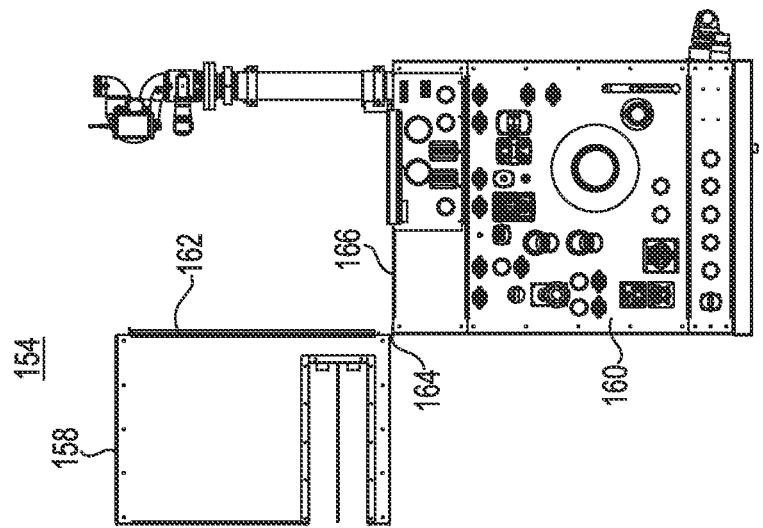
FIGS. 4-6 are side views of the pump module of the fire truck of FIG. 2 in a closed position, an intermediate position and an open position, respectively.
Figure 5:
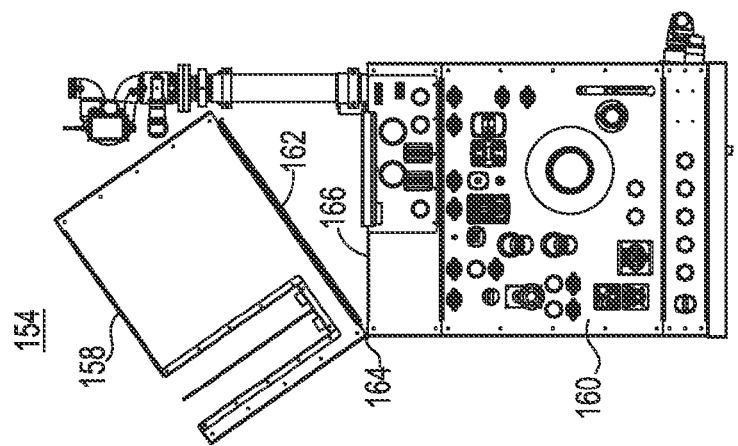
Figure 4:
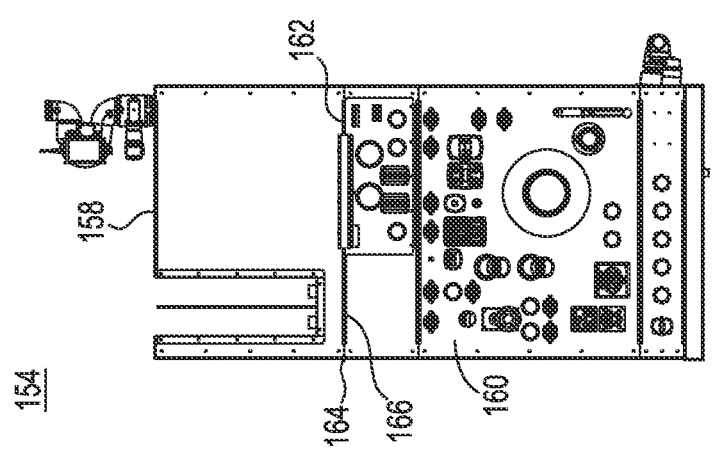
Figure 7:
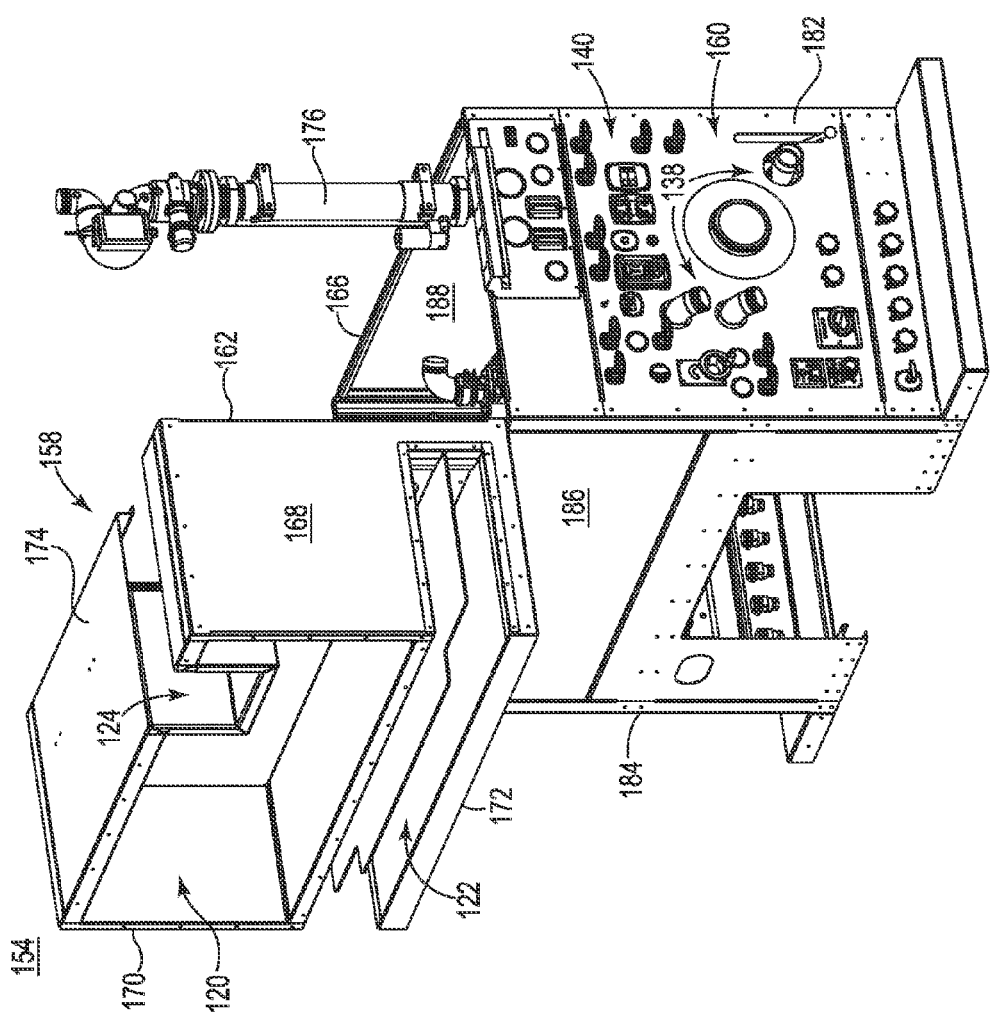
FIGS. 7-11 illustrate different views of the pump module illustrated in FIGS. 4-6.
Figure 8:
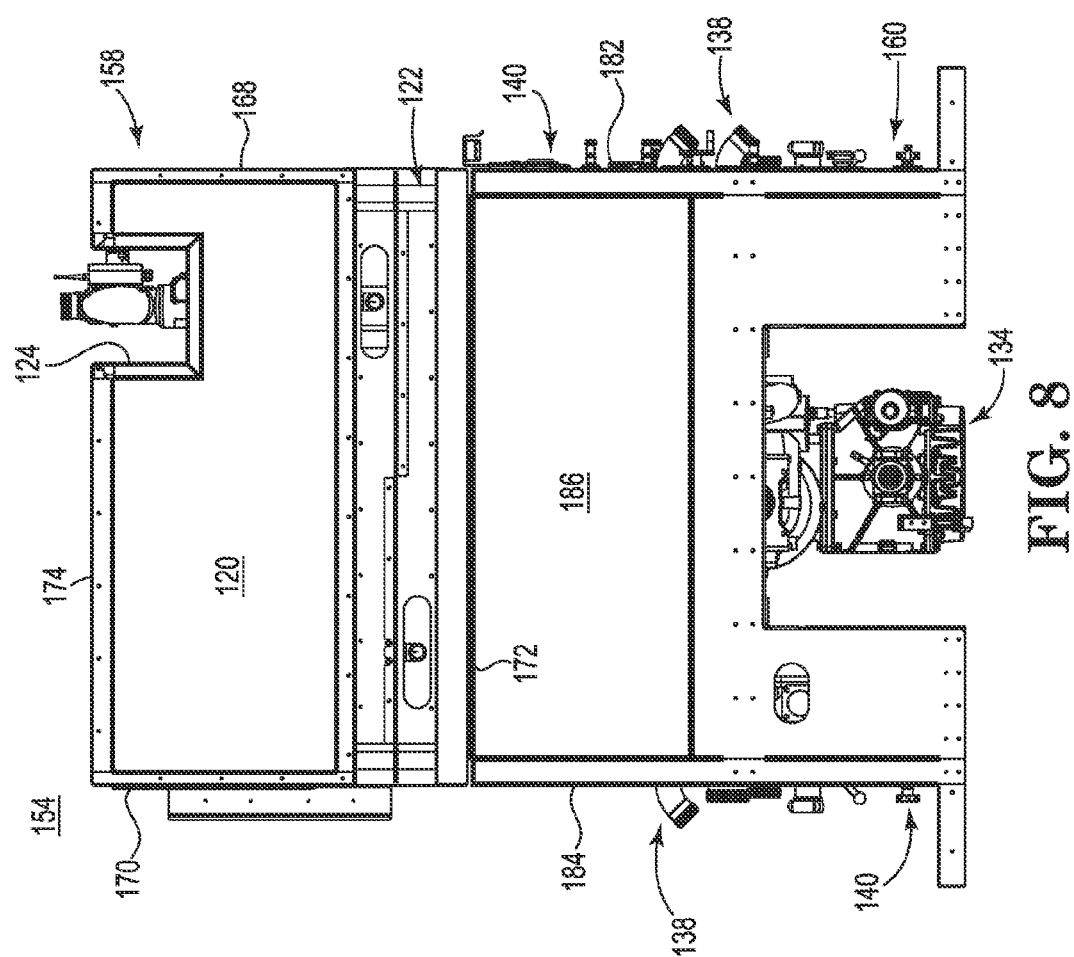
Figure 9:
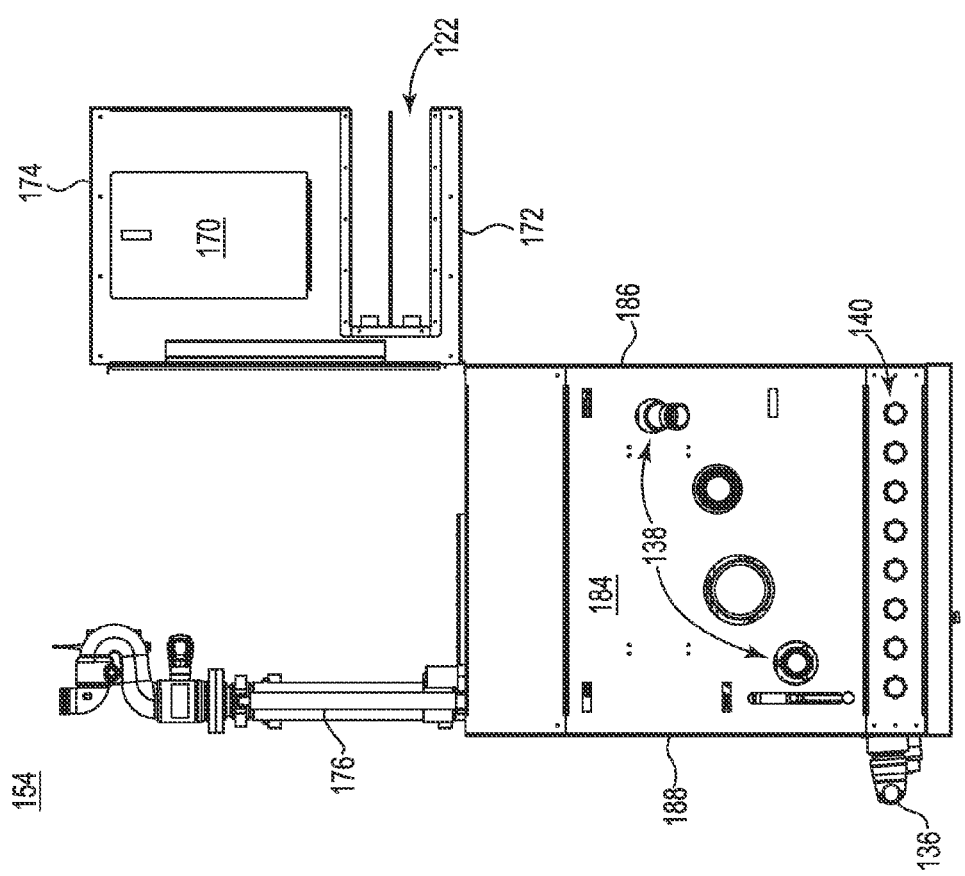
Figure 10:
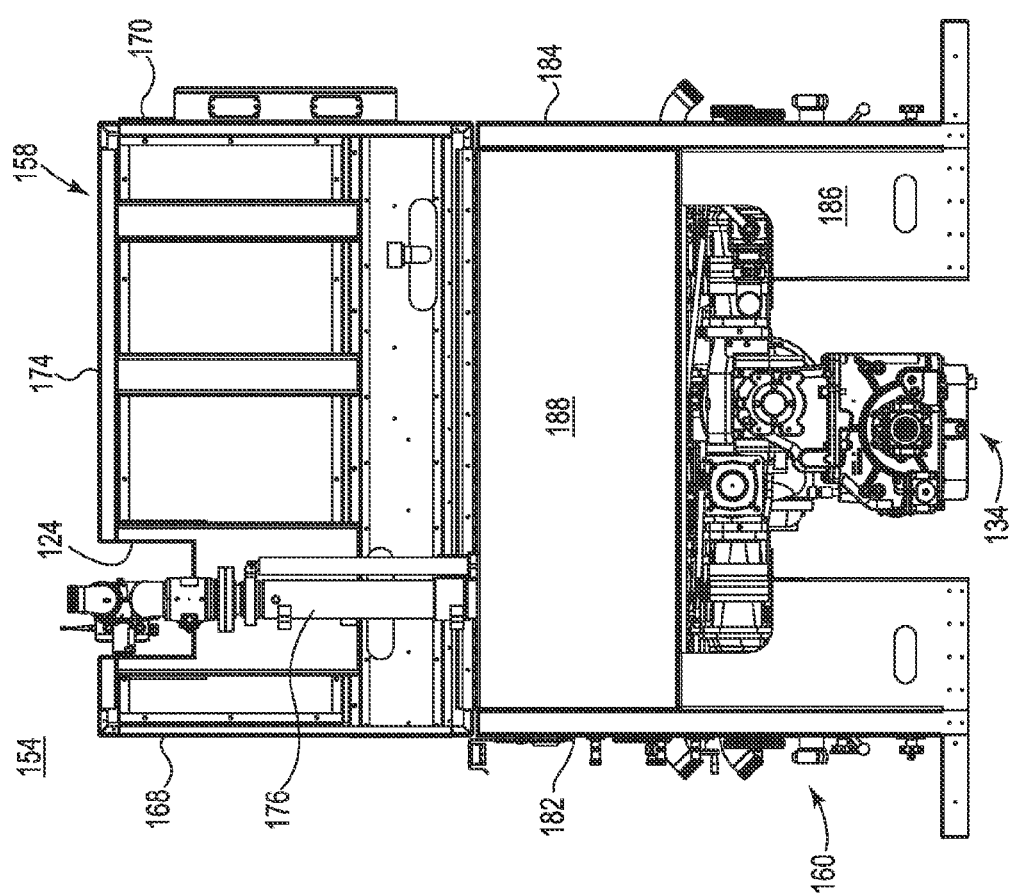
Figure 11:
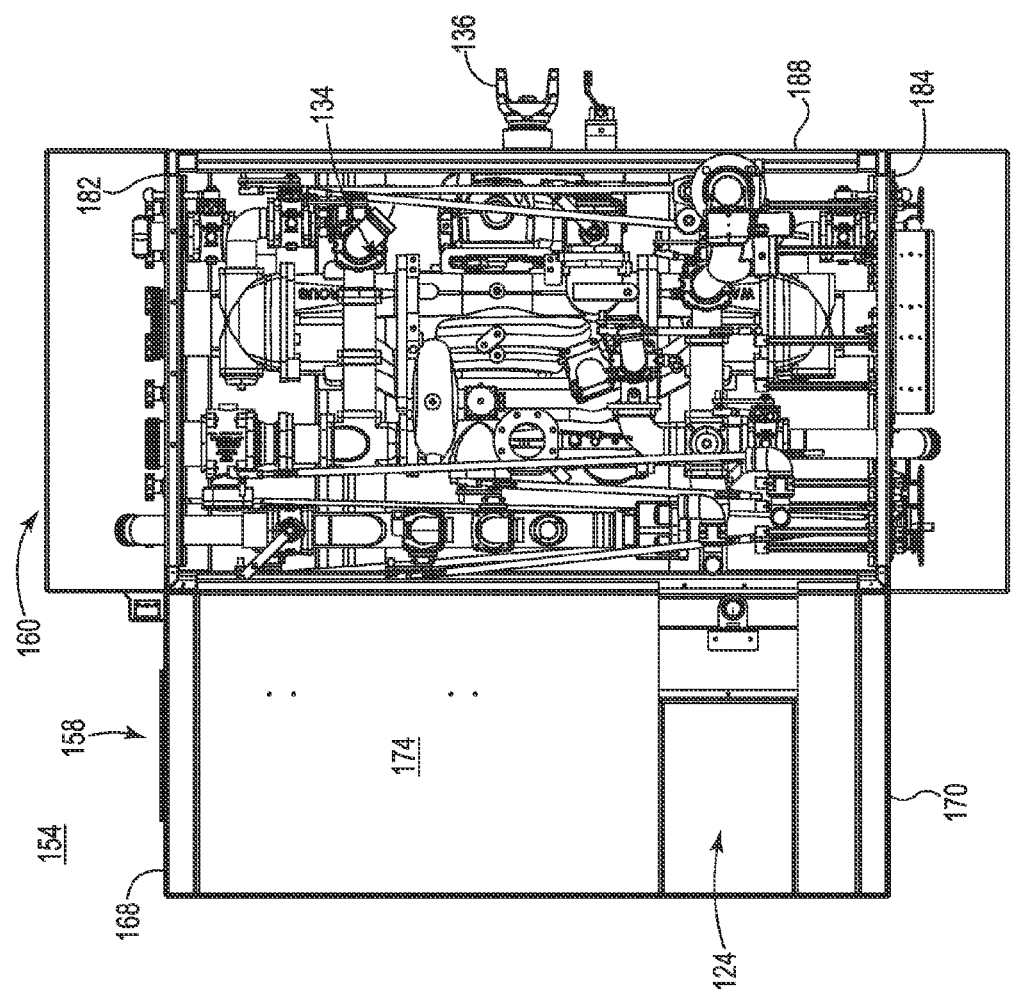
Figure 12:
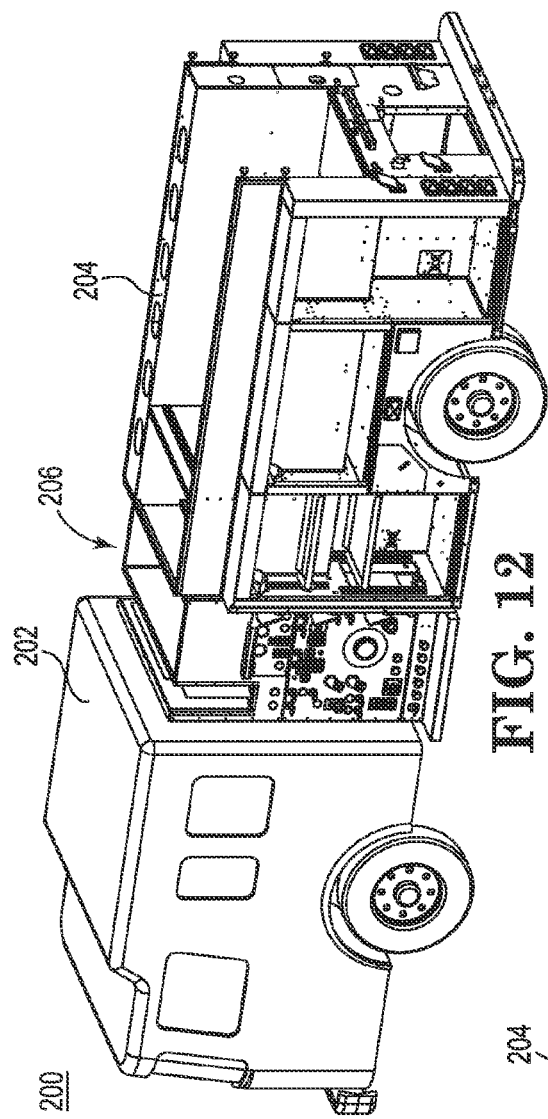
FIGS. 12-13 are isometric views of an alternative fire truck.
Figure 13:
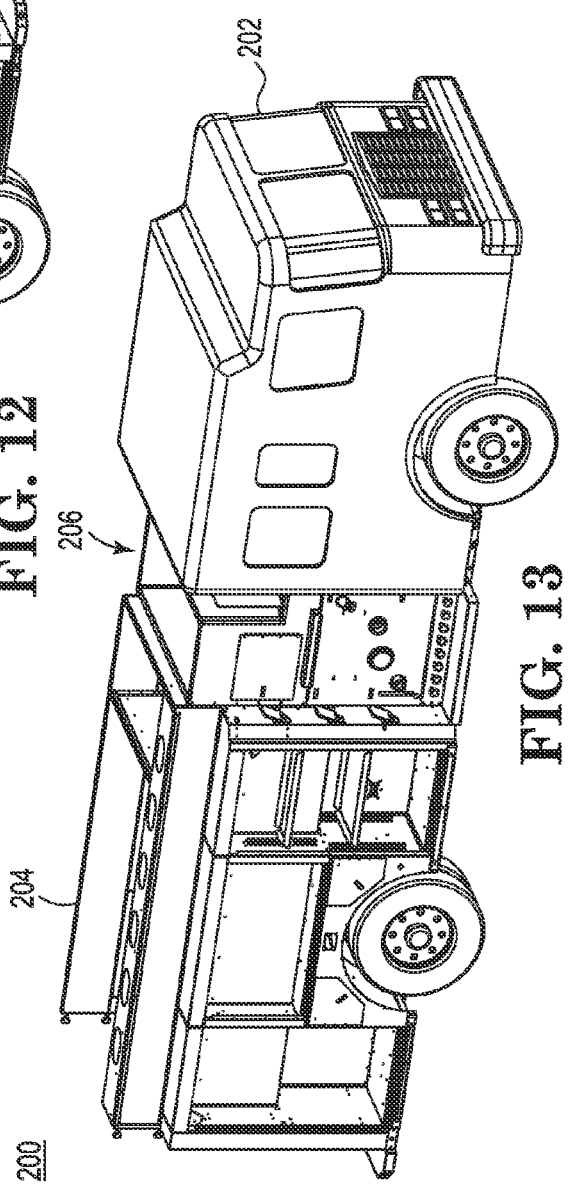
Figure 16:
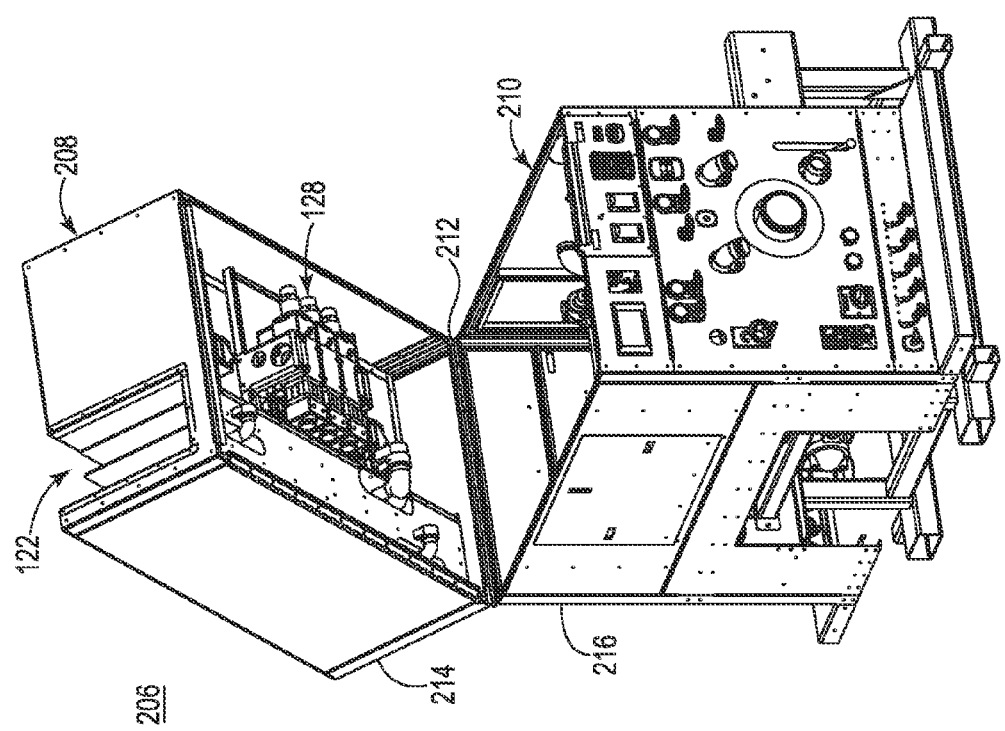
FIGS. 16-21 illustrate different views of an alternative pump module of the fire truck of FIG. 12.
Figure 17:
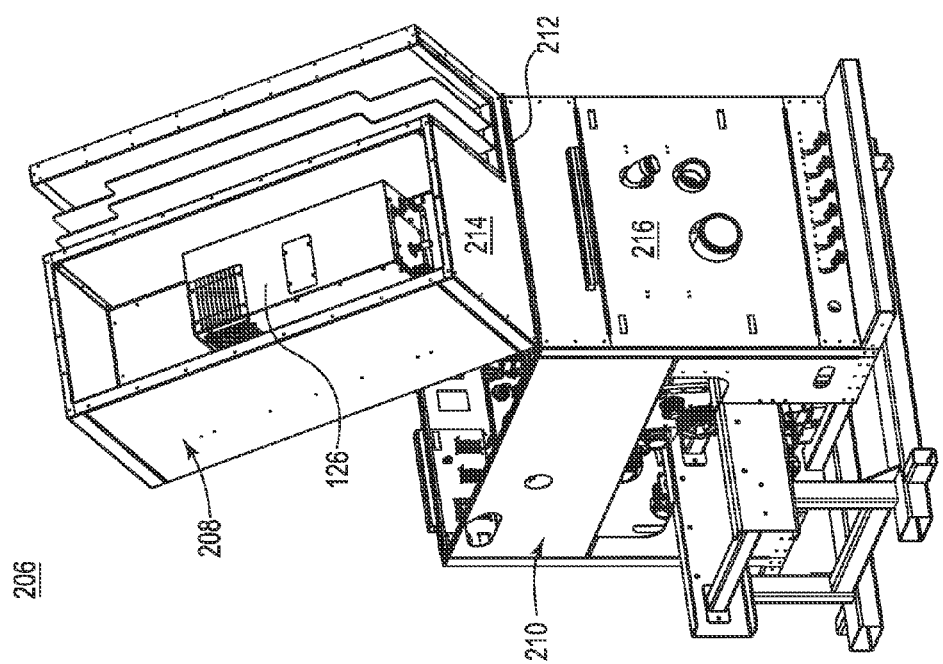
Figure 19:
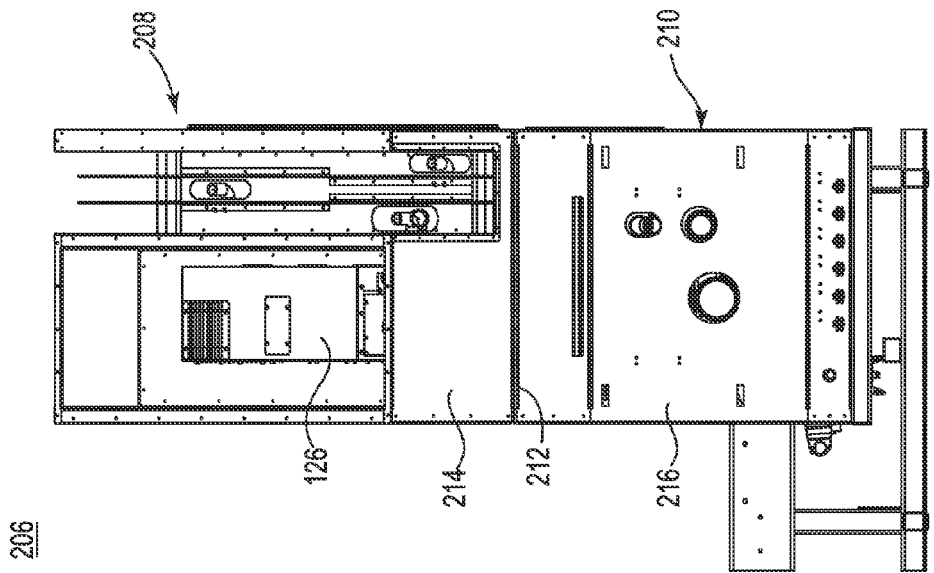
Figure 18:
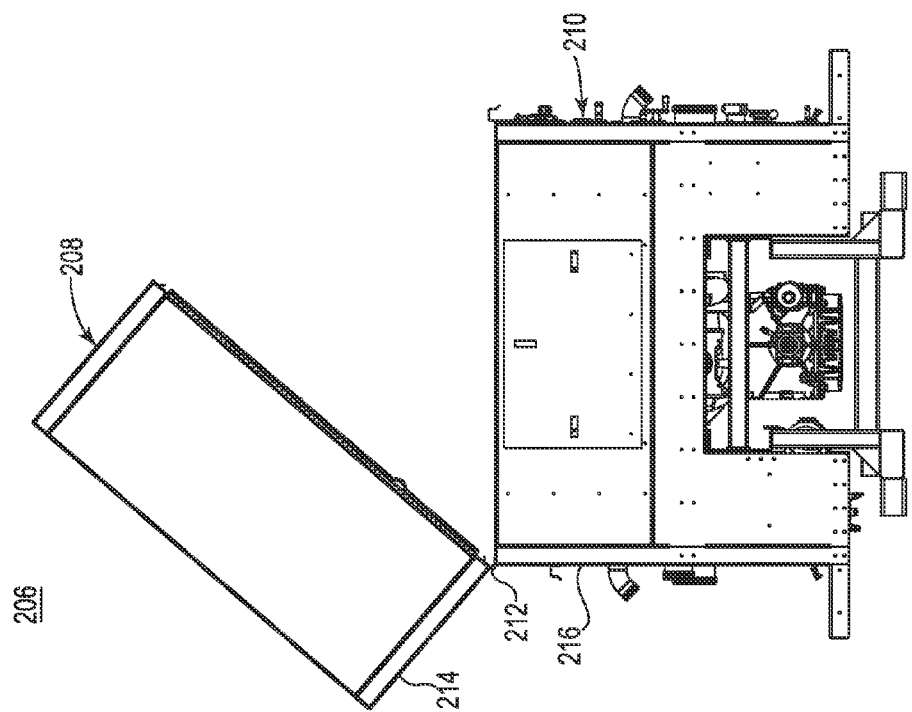
Figure 21:
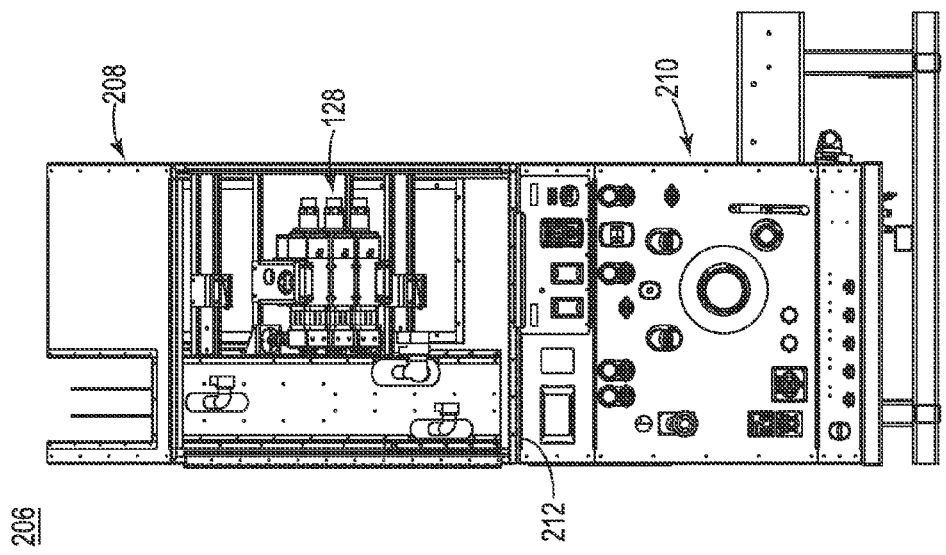
Figure 20:
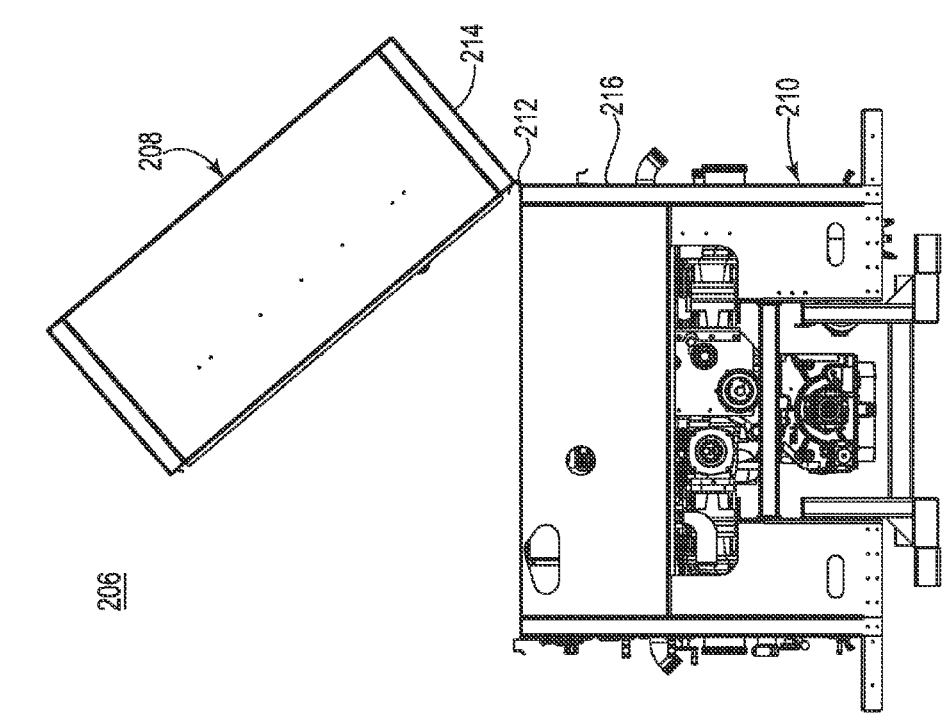

As schematically illustrated in FIG. 1, a fire truck 100 includes an operator cab 102, a rear body 104 and a pump module 106 positioned between the operator cab 102 and the rear body 104. The operator cab 102, rear body 104 and pump module 106 are mounted to a chassis 108. The operator cab 102 is positioned at a front of the truck and houses a driver and one or more passengers during operation of the truck 100. In one embodiment, the operator cab 102 can be tilted with respect to the chassis 108 from a first, operating position to a second, open position. In the open position, an engine 110 mounted to the chassis 108 is revealed. The engine 110 provides power to the truck 100 (e.g., to rear drive wheels in rear body 104) and can be coupled with one or more components of the pump module 106. Further, the pump module 106 is configured to accommodate connections from the engine 110 to components in pump module 106 and rear body 104.

The pump module 106 includes both an upper housing 112 and a lower housing 114. Both the upper housing 112 and the lower housing 114 support several different components useful in extinguishing fires using the fire truck 100. By way of example, the upper housing 112 can include a storage bin 120, a hose rack 122, a cavity or sleeve 124, a hydraulic generator 126 and a fluid connection 128. The storage bin 120 can be used to store items of use. In one example, the storage bin 120 can be used to support the hydraulic generator 126 and the fluid connection 128. The fluid connection 128 can connect the hydraulic generator 126 to a remote oil reservoir (not shown). The hose rack 122 is used to store one or more hoses. These hoses can be connected (also known as "pre-connected") to the lower housing 114 prior to arriving at a fire so as to save time in extinguishing the fire. The cavity or sleeve 124 can be used to accommodate a conduit from the lower housing that leads to a deck gun 130.

The lower housing 114 can include a foam system 132, a pump assembly 134, one or more engine connections 136, one or more fluid connections 138, one or more operator controls 140, one or more displays 142 and one or more platforms 144, as discussed in more detail below. The foam system 132 can provide a foaming agent to pump assembly 134. The pump assembly 134 includes plumbing that receives water from one or more of the fluid connections 138 (e.g., input from a water source such as a tank, fire hydrant, pond) and provides water (or water mixed with foaming agent) to one of the fluid connections 138 (i.e., a discharge). In one embodiment, at least one of the fluid connections 138 are connected to hoses stored in the hose rack 122. The pump assembly 134 can also provide water or mixture to the deck gun 130.

The engine connection 136 (e.g., a transmission) provides connection between the pump assembly 134 and the engine 110 so that the engine 110 drives operation of the pump assembly 134. In one embodiment, the engine connection 136 can include a split-shaft transmission or a power-take-off (PTO) transmission. A further engine connection 136 can provide power to components in the rear body 104 (e.g., rear drive wheels). The operator controls 140 can include several inputs for controlling operation of the pump assembly 134. For example, the operator controls 140 can select a type of foam mixture output by the pump assembly 134 as well as a rate at which the type of foam mixture is provided to the fluid connections 138. The displays 142 display information related to operation of the pump assembly 134 and can be provided adjacent to or separate from the operator controls 140. In addition, the one or more platforms 144 are provided for a technician to perform maintenance/repair on the pump assembly 134.

As discussed in more detail below, the upper housing 112 is movable relative to the lower housing 114 from an operating position to an open position. In one embodiment, a hinge is used to connect the upper housing 112 and the lower housing 114, such that the upper housing 112 pivots with respect to the lower housing 114. For example, upper housing 112 can pivot in a range of 0-90 degrees with respect to lower housing 114. In another embodiment, the upper housing 112 is connected to the lower housing 114 through one or more vertical supports that allow linear positioning of the upper housing 112 with respect to the lower housing 114. Regardless of the particular connection utilized, moving upper housing 112 from the open position to the operating position allows a technician to easily access the pump assembly 134 and related components so as to provide maintenance and/or repair.

In one particular construction, upper housing 112 and lower housing 114 include a frame and panels formed of 12 gauge stainless steel. In other embodiments, aluminum can be utilized for one or more portions of upper housing 112 and lower housing 114. A sub-frame for the module 106 can include two plates that extend a full length of the module 106 from front to back, providing rigid lateral support for the pump module 106 and evenly distributing weight of the pump assembly 134 and other associated components onto the chassis 108. In one example implementation, upper housing 112 is approximately one-third of an overall height for pump module 106, although other ratios (e.g., 1:1, 1:3, 1:4) for a height of upper housing 112 to a height of lower housing 114 can be used.

FIGS. 2-3 illustrate schematic side views of an exemplary fire truck 150 embodying concepts discussed above with respect to FIG. 1. Fire truck 150 includes an operator cab 152 and a pump module 154 mounted to a chassis 156. A rear body is also part of truck 150 and positioned adjacent pump module 154, but is not shown in FIGS. 2 and 3. The pump module 154 includes an upper housing 158 and a lower housing 160. Each of the housings 158 and 160 can include one or more components discussed above with respect to FIG. 1. Fire truck 150 is movable from an operating position (FIG. 2) to a repair or maintenance position (FIG. 3). In particular, the operator cab 152 can be positioned with respect to chassis 156 from a first, operating position (FIG. 2) to a second, open position (FIG. 3). In a similar manner, the upper housing 158 can be positioned with respect to the lower housing 160 from a first, operating position (FIG. 2) to a second, open position (FIG. 3). When upper housing 158 is in the open position, the upper housing 158 is spaced apart from the lower housing.

FIG. 3 illustrates the fire truck 150 in which operator cab 152 has been tilted forward to its open position with respect to the chassis 156. In the open position, a lower side of the operator cab 152 is tilted away from the chassis 156. In contrast, the lower side of the operator cab 152 is substantially parallel with the chassis 156 (i.e., extending horizontal to gravity) in the operating position. Upper housing 158 has been tilted forward to the open position with respect to lower housing 160 into space previously occupied by the operator cab 152. In the open position, a lower perimeter 162 of the upper housing 158 is tilted about a hinge 164 away from an upper perimeter 166 of the lower housing 160. In contrast, the lower perimeter 162 of upper housing 158, when in the operating position, is in contact with the upper perimeter 166 of lower housing 160 and substantially parallel to the chassis 156. In the open position, repair and/or maintenance of components positioned within the lower housing 160 can be performed.

FIGS. 4-11 illustrate various views of pump module 154. Pump module 154 can be built and assembled separate from the remainder of truck 150 and mounted to chassis 156 upon final assembly of the truck 150. The upper housing 158 is pivotally connected to lower housing 160 through the hinge 164. A locking mechanism (not shown) can be provided to lock the upper housing 158 to the lower housing 160 during operation of the truck such that lower perimeter 162 maintains contact with upper perimeter 166.

The upper housing 158 is rectangularly shaped, forming the lower perimeter 162. In particular, the upper housing 158 includes opposed, exterior panels 168, 170 and opposed interior panels 172, 174. The upper housing 158 can include various features as desired and, in the illustrated embodiment, includes storage bin 120, hose rack 122 and cavity 124. The storage bin 120 can store items as desired such as buckets, shovels, generators, etc. Hose rack 122 can be used to store hoses. In one instance, these hoses are referred to as "pre-connect" hoses and are connected to the pump module 154 for delivery of water prior to arriving at a fire site. The rack 122, in one embodiment, can include one or more fluid connections to connect the hoses. Cavity 124 accommodates plumbing 176 that can transport water to a deck gun.

Lower housing 160 includes a rectangular enclosure that defines the upper perimeter 166. The upper perimeter 166 includes a top opening to allow access to the enclosure. In particular, the enclosure surrounds and supports a pump assembly 180, which includes one or more components such as a water pump, a pump engine, a transmission connection, plumbing conduits, priming system, etc. The lower housing 160 further includes opposed exterior panels 182 and 184 that include connections 138 and controls 140 accessible by an operator in controlling pump assembly 134. For example, panel 182 can maintain an intake to pump assembly 134 and a discharge from pump assembly 134. Additionally, the lower housing 160 also includes opposed interior panels 186 and 188 that can include openings to accommodate chassis 156 and a connection from pump assembly 134 to the engine 110 for powering the pump assembly 134. Upon movement of the upper housing 158 to the open position, a user can have easy access to the pump assembly 134 through the top opening in the lower housing 160 as defined by the upper perimeter 166.

FIGS. 12-15 illustrate an alternative embodiment of a fire truck 200 having an operator cab 202, rear body 204 and pump module 206. FIGS. 16-21 illustrate the pump module 206 in greater detail, including an upper housing 208, a lower housing 210 and a hinge 212 connecting the upper housing 208 to the lower housing 210. In this embodiment, hinge 212 connects an exterior panel 214 of upper housing 208 with an exterior panel 216 of lower housing 210. To access pump assembly 134 upper housing 208 is tilted away toward exterior panel 216. As such, operator cab 202 need not be moved to the open position to access the pump assembly 134. Pump module 206 also supports hydraulic generator 126 and fluid connection 128.

Figure 22:
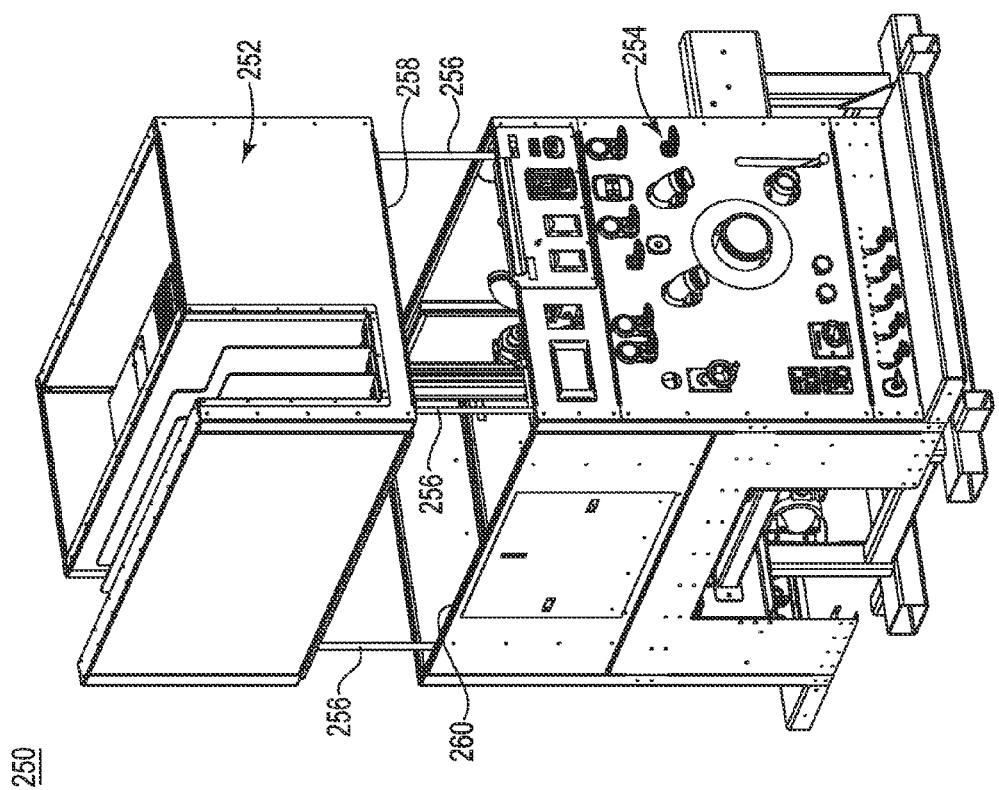
FIGS. 22-23 illustrate different views of another alternative pump module.
Figure 23:
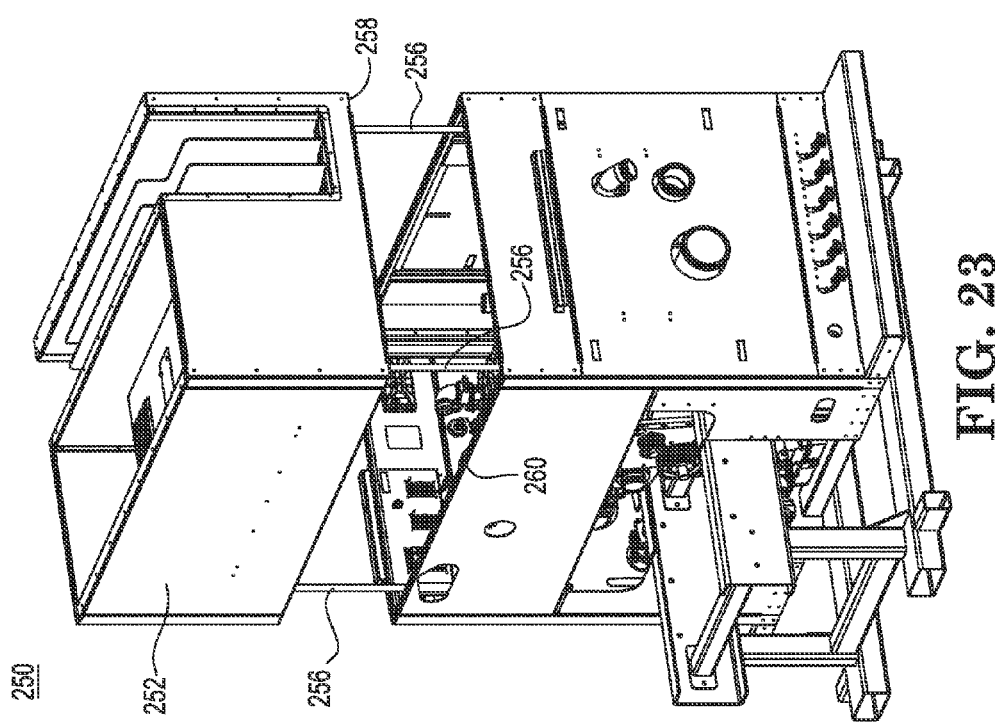

FIGS. 22-23 illustrate another embodiment of a pump module 250. In contrast to using a hinge, an upper housing 252 and a lower housing 254 are coupled together with vertical supports 256. The supports 256 are positioned in four corners of each of the upper housing 252 and lower housing 254. Additionally, the supports 256 are configured to move the upper housing 252 in a vertical manner with respect to the lower housing 254. The pump module 250 is illustrated in an open position where a lower perimeter 258 of upper housing 252 is separated from an upper perimeter 260 of lower housing 254. Supports 256 can be used to move lower perimeter 258 into engagement with upper perimeter 260 to an operating position. In one embodiment, a lift mechanism (not shown) can be used to move the upper housing 252 in a vertical manner with respect to the lower housing 254 and in particular move the lower housing between the open position and the operating position. The hydraulic generator 126 is further illustrated within storage bin 120.

Figure 24:
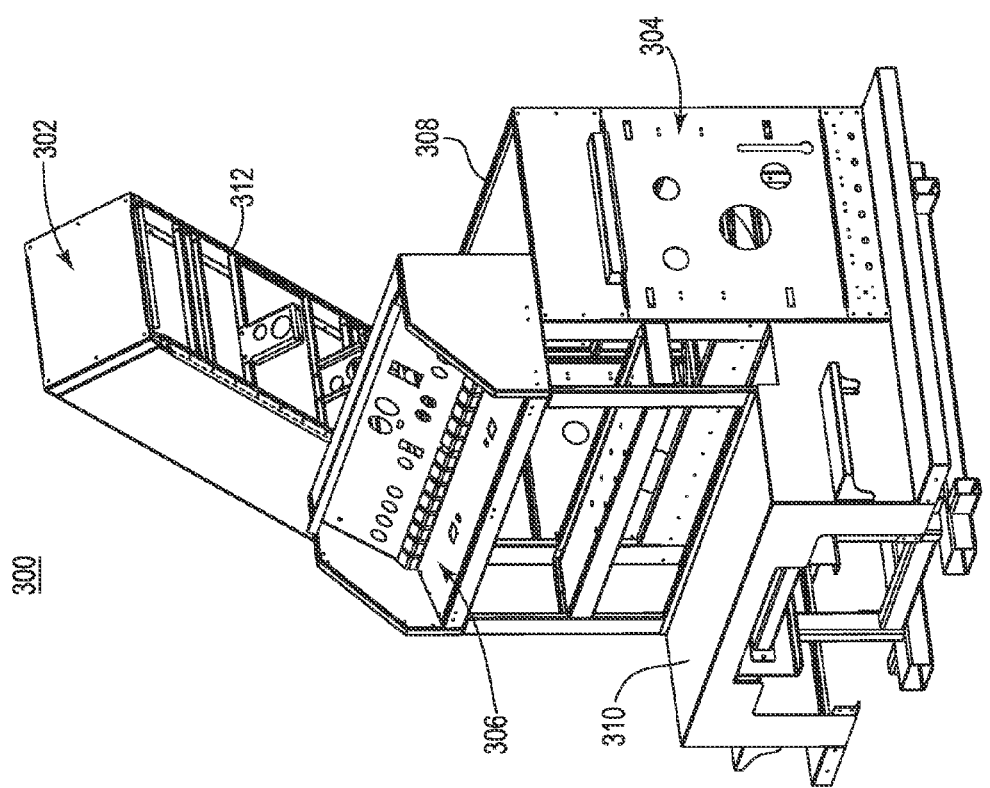
FIGS. 24-25 illustrate different views of another alternative pump module.
Figure 25:
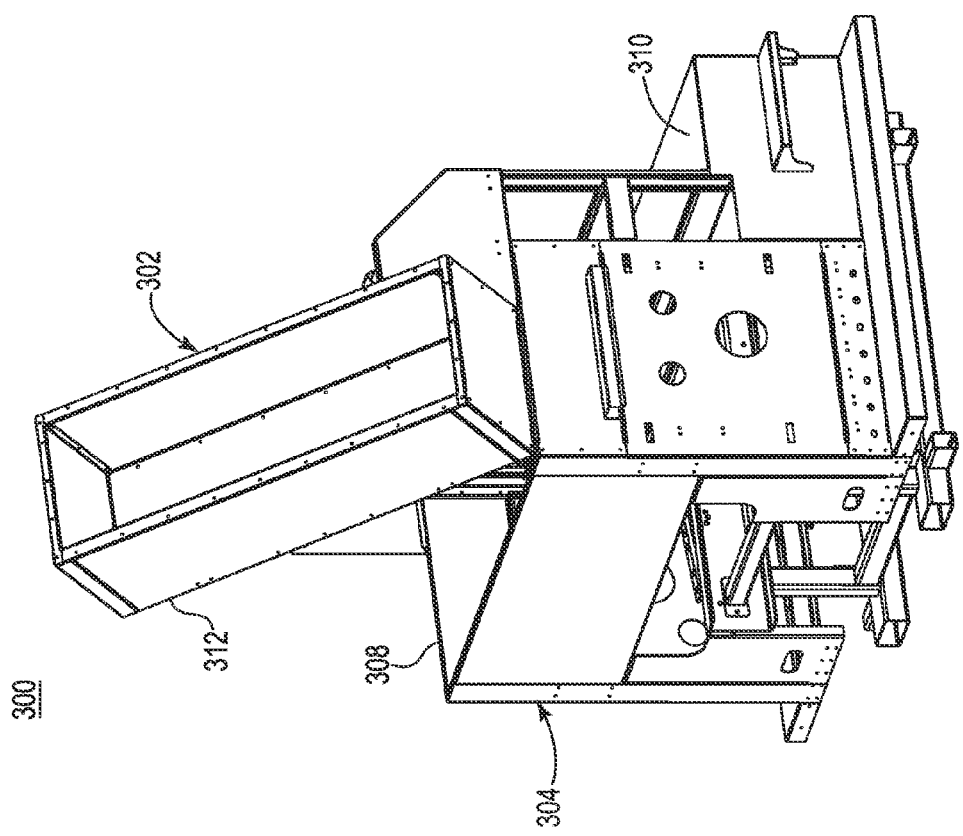

FIGS. 24-25 illustrate another alternative pump module 300 having an upper housing 302 and a lower housing 304. In this embodiment, the pump module 300 includes a top mounted control panel 306 positioned over a portion of an upper perimeter 308 of the lower housing 304. A step 310 is also provided so that an operator can stand on the step 130 to operate the pump assembly 134 using panel 306. Upper housing 302 is positioned adjacent the control panel 306. The lower perimeter 312 of upper housing 302 engages upper perimeter 308 when the upper housing 302 is in an operating position. As illustrated, upper housing 302 is in an open position where lower perimeter 312 is tilted away from upper perimeter 308.

Figure 26:
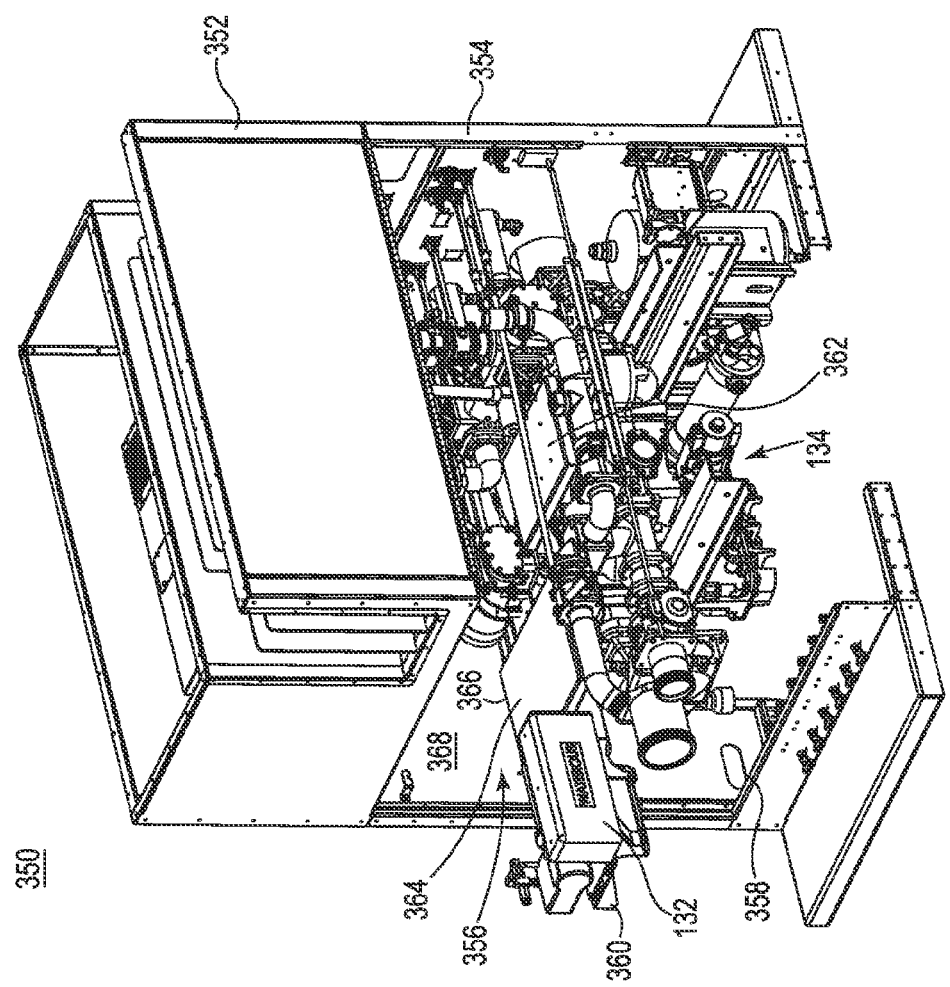
FIG. 26 is an isometric view of another alternative pump module with panels removed.

FIG. 26 illustrates an alternative pump module 350 having an upper housing 352 and a lower housing 354, wherein an exterior panel and interior panel are not shown. The lower housing 354, in this embodiment, is equipped to have exterior panels easily removable from the pump module 350 so as to allow another point of access to components within the lower housing 354. For example, the exterior panel removed in FIG. 26 reveals an opening 356. The opening 356 can be revealed by a variety of different mechanisms. For example, the exterior panel can be connected to the lower housing with one or more fasteners (e.g., screws) that secure the panel to the lower housing 354. Removal of the fasteners allows the panel to then be separated from the lower housing 354. In another embodiment, the panel can be connected to the lower housing through a hinge (not shown) that can connect the exterior panel with a lower portion 358 of the lower housing 354.

In addition to providing exterior panels that are removable, pump module 350 can include further features as illustrated. For example, lower housing 354 includes foam system 132. Foam system 132 is mounted to lower housing 354 such that its position with respect to opening 356 can be adjusted as desired. As illustrated, foam system 132 has been rotated exterior to lower housing 354. To facilitate movement of foam system 132 with respect to lower housing 354, the foam system 132 can be mounted to a bracket 360, with a hinge, slide or other mechanism allowing movement (e.g., rotational, linear) of the bracket 360 relative to the lower housing 354.

Lower housing 354 can further include platforms 362 and 364. Platform 362 can be mounted within the lower housing 354 such that a technician can kneel on the platform so as to perform maintenance on pump assembly 134. The platform 362 can be formed of metal or other suitable material as desired and mounted, for example, to a support beam (not shown) to support the technician. Platform 364 can be formed in a similar manner and otherwise mounted to the lower housing 354. In one embodiment, the platform 364 can be connected to the housing 354 through a connection mechanism (e.g., a hinge or slide) that allows movement of the platform 364 relative to the lower housing 354. In the embodiment illustrated, a hinge 366 connects platform 364 and an interior panel 368.

Although the present invention has been described with reference to preferred embodiments, workers skilled in the art will recognize that changes can be made in form and detail without departing from the spirit and scope of the present invention.

What is claimed is:
1. A pump module mountable to a chassis of a fire truck, comprising:
   a pump assembly having a water pump and plumbing connected to the water pump;

a lower housing defining an enclosure that includes opposed exterior panels, opposed interior panels and a top opening defined by an upper perimeter, wherein at least one of the exterior panels maintains a fluid connection to the plumbing of the pump assembly and at least one of the interior panels includes an interior opening to accommodate the chassis and a connection between the water pump and an engine;

an upper housing defining a lower perimeter that can be positioned with respect to the upper perimeter, the upper housing configured to transition between a first, operating position wherein the lower perimeter engages the upper perimeter and a second, open position wherein the lower perimeter is spaced apart from the upper perimeter.

2. The pump module of claim 1, wherein the upper perimeter pivots with respect to the lower perimeter.

3. The pump module of claim 2, wherein a hinge connects the upper housing with one of the exterior panels of the lower housing.

4. The pump module of claim 2, wherein a hinge connects the upper housing with one of the interior panels of the lower housing.

5. The pump module of claim 1, wherein the upper perimeter moves in a vertical manner with respect to the lower perimeter such that, in both the operating position and the open position, the upper perimeter is parallel to the lower perimeter.

6. The pump module of claim 1, wherein the upper housing includes at least one of a storage bin, hose rack, cavity, hydraulic generator and fluid connection.

7. The pump module of claim 1, wherein the upper housing includes a cavity that accommodates plumbing leading to a deck gun, the plumbing connected to the pump assembly.

8. The pump module of claim 1, wherein the lower housing includes a foam assembly fluidly connected with the pump assembly.

9. The pump module of claim 8, wherein the foam assembly is movable with respect to the lower housing.

10. The pump module of claim 1, wherein the exterior panels support at least one of a fluid connection to the pump assembly and an operator control of the pump assembly.

11. The pump module of claim 1, wherein the lower housing includes a platform mounted therein to support a technician operating on components within the lower housing.

12. A fire truck, comprising:

a chassis;

an operator cab mounted to the chassis and including an engine;

a rear body mounted to the chassis;

a pump module body mounted to the chassis and positioned between the operator cab and the rear body, the pump module including an upper housing and a lower housing, the upper housing including a lower perimeter and the lower housing including an upper perimeter, wherein the pump module is configured to transition between an operating position defined by the lower perimeter of the upper housing being engaged with the upper perimeter of the lower housing and an open position defined by the lower perimeter being spaced apart from the upper perimeter.

13. The fire truck of claim 12, wherein the lower housing includes a rectangular enclosure having a top opening facing the upper housing.

14. The fire truck of claim 13, wherein the rectangular enclosure surrounds a pump assembly including a water pump and plumbing connected to the water pump.

15. The fire truck of claim 14, wherein the lower housing includes an opening to accommodate an engine connection between the engine and the pump assembly.

16. The fire truck of claim 12, wherein the operator cab includes an upper side and a lower side, the operator cab configured to pivot from a first position where the lower side is substantially parallel to the chassis to a second position where the lower side is tilted away from the chassis, the operator cab further occupying space in the first position and vacating the space in the second position, the upper housing occupying the space in the second position when the upper housing is in the open position.

17. The fire truck of claim 12, wherein the upper perimeter and the lower perimeter are substantially parallel to the chassis in the operating position.

18. The fire truck of claim 17, wherein the lower perimeter is non-parallel with respect to the chassis in the open position.

19. The fire truck of claim 17, wherein the lower perimeter is substantially parallel with respect to the chassis in the open position.

20. A method of performing fire truck repair and/or maintenance, comprising:

accessing a fire truck having a chassis, an operator cab, and a pump module, the pump module including:

a pump assembly having a water pump and plumbing connected to the water pump;

a lower housing defining an enclosure that includes opposed exterior panels, opposed interior panels and a top opening defined by an upper perimeter, wherein at least one of the exterior panels maintains a fluid connection to the plumbing of the pump assembly and at least one of the interior panels includes an interior opening to accommodate the chassis and a connection between the water pump and an engine;

an upper housing defining a lower perimeter that can be positioned with respect to the upper perimeter, the upper housing configured to transition between a first, operating position wherein the lower perimeter engages the upper perimeter and a second, open position wherein the lower perimeter is spaced apart from the upper perimeter; and separating an upper housing of the pump module from a lower housing of the pump module such that the upper housing transitions to the open position.

21. A pump module mountable to a chassis of a fire truck, comprising:

a pump assembly having a water pump and plumbing connected to the water pump;

a lower housing defining an enclosure that includes opposed exterior panels, opposed interior panels and a top opening defined by an upper perimeter, wherein at least one of the exterior panels maintains a fluid connection to the plumbing of the pump assembly and at least one of the interior panels includes an interior opening to accommodate the chassis and a connection between the water pump and an engine;

an upper housing defining a lower perimeter that can be positioned with respect to the upper perimeter; and means for allowing transition of the upper housing between a first, operating position wherein the lower perimeter engages the upper perimeter and a second, open position wherein the lower perimeter is spaced apart from the upper perimeter.

* * * * *